United States Patent
Chen

(10) Patent No.: US 9,676,233 B1
(45) Date of Patent: Jun. 13, 2017

(54) BICYCLE HUB APPARATUS

(71) Applicant: Ching-Shu Chen, Changhua (TW)

(72) Inventor: Ching-Shu Chen, Changhua (TW)

(73) Assignee: CHOSEN CO. LTD., Changhua (TW)

( * ) Notice: Subject to any disclaimer, the term of this patent is extended or adjusted under 35 U.S.C. 154(b) by 0 days.

(21) Appl. No.: 15/009,385

(22) Filed: Jan. 28, 2016

(51) Int. Cl.
  *F16D 11/00* (2006.01)
  *B60B 27/04* (2006.01)
  *B60B 27/02* (2006.01)
  *F16D 41/12* (2006.01)

(52) U.S. Cl.
  CPC ......... *B60B 27/047* (2013.01); *B60B 27/023* (2013.01); *F16D 41/12* (2013.01)

(58) Field of Classification Search
  CPC ...... B60B 27/047; B60B 27/023; F16D 41/12
  See application file for complete search history.

(56) References Cited

U.S. PATENT DOCUMENTS

| | | | | |
|---|---|---|---|---|
| 2007/0089959 A1* | 4/2007 | Kanehisa | ............... | F16D 41/30 192/64 |
| 2008/0017471 A1* | 1/2008 | Kanehisa | ............... | B60B 27/0005 192/64 |
| 2009/0277741 A1* | 11/2009 | Chen | ............... | B60B 27/023 192/64 |
| 2010/0224458 A1* | 9/2010 | Shook | ............... | B60B 27/047 192/46 |
| 2011/0094846 A1* | 4/2011 | Wu | ............... | B60B 27/023 192/64 |
| 2011/0148183 A1* | 6/2011 | Chen | ............... | B60B 27/023 301/110.5 |
| 2012/0139327 A1* | 6/2012 | Chen | ............... | B60B 27/047 301/110.5 |

* cited by examiner

*Primary Examiner* — David J Hlavka
(74) *Attorney, Agent, or Firm* — Che-Yang Chen; Law Offices of Scott Warmuth

(57) ABSTRACT

A bicycle hub apparatus may include a hub body, a driving ring, a freewheel body, and a ratchet unit. A plurality of driving teeth are sequentially formed around an inner periphery of the driving ring. Since the separated distances between two adjacent driving teeth is smaller, the driving ring comprises more driving teeth, and the number thereof is up to 155 teeth. Also, the ratchet unit comprises a plurality of engaging pieces, and each of the engaging pieces has numerous engaging teeth, and the sizes thereof are corresponding to the driving teeth. As a result, the bicycle hub apparatus in the present invention improves the efficiency of engaging process between the engaging teeth and the driving teeth, and further lowers the possibility of missing step and the risk of use.

7 Claims, 8 Drawing Sheets

BICYCLE HUB APPARATUS

FIELD OF THE INVENTION

The present invention relates to a hub apparatus and more particularly to a bicycle hub apparatus.

BACKGROUND OF THE INVENTION

Generally, referring to FIG. 9, a quick-engaging hub apparatus comprises a shaft (50) and a hub body (60). The hub body (60) is rotatably mounted on the shaft (50), and a first end of the hub body (60) has a ratchet slot (61). An inner periphery of the ratchet slot (61) comprises a plurality of engaging slots (611), and each two adjacent engaging slots (611) are separated with the same distance. A freewheel body (70) is rotatably mounted on the shaft (50) after the hub body (60), and a first end of the freewheel body (70) facing to the hub body (60) has a wheel body (71) which is mounted on the ratchet slot (61). A plurality of accommodating slots (72) formed on the wheel body (71) are divided into two different formations, a first formation and a second formation, and the first and second formations of the accommodating slots (72) are arranged in alternating pattern around the wheel body (71). Also, separated distances between two adjacent accommodating slots (72) are arranged in two alternating distances which are a width and a width adding a tooth width of the engaging slot (611). Moreover, each of the accommodating slots (72) has an engaging piece (73) and an elastic piece (74) respectively formed at a first end and a second end thereof. Thus, when a bicyclist pedaling forward, the engaging slots (611) on the ratchet slot (61) will engage with the engaging pieces (73) which are the nearest to the engaging slots (611) to achieve a quick-engaging effect.

However, the conventional bicycle hub apparatus is disadvantageous because: (i) the engaging slots (611) on the hub body (60) are engaged with the engaging pieces (73) in a radial engagement manner. Although the radial engagement manner smooths the running action of the bicycle, the engaging pieces (73) might bear an uneven force when shifted on the engaging slots (611). As a result, after a period of use, partial engaging pieces (73) having more abrasions are more likely to be damaged, and thus the engaging pieces (73) needs to be inspected and replaced frequently; and (ii) the number of the engaging slots (611) of the ratchet slot (61) is too small that separated distances between each two engaging slots are increased, resulting in an engaging angle between single engaging piece (73) and single engaging slot (611) being more than 90 degrees. Also, the moving distance for the engaging piece (73) to engage with an engaging slot (611) and the fictional resistance between the engaging pieces (73) and the engaging slots (611) are increased, so that the engaging process consumes a great number of performances, reducing the turns of the bicycle hub apparatus and the sliding distance of the bicycle. Moreover, when a bicyclist starts pedaling again, due to the longer separated distances between the each two engaging slots (611), the engaging pieces (73) might be unable to engage with the engaging slots (611) immediately, resulting in the missing step or the lack of safety. Therefore, there remains a need for a new and improved design for a bicycle hub apparatus to overcome the problems presented above.

SUMMARY OF THE INVENTION

The present invention provides a bicycle hub apparatus, which comprises a hub body, a driving ring, a freewheel body, and a ratchet unit. The hub body is rotatably mounted on a shaft, and a connecting space formed at a first end of the hub body is configured to engage with the driving ring. The driving ring has an inner periphery and an outer periphery, and a plurality of driving teeth are sequentially formed around the inner periphery of the driving ring, and the number of the driving teeth can be between 145 and 155 teeth. Also, an angle of a peak of each of the driving teeth can be between 57 and 62 degrees, and an angle between two adjacent driving teeth can be between 55 and 60 degrees. The freewheel body is mounted on the first end of the hub body, and a first end of the freewheel body facing to the hub body comprises a protruding portion. An outer periphery of the protruding portion has at least two engaging slots to respectively engage with two engaging pieces of the ratchet unit. Also, the number of the engaging pieces of the ratchet unit is the same as the engaging slots of the freewheel body. Each of the engaging pieces comprises an elastic piece which is configured to engage with the engaging slot, so that the engaging pieces can be secured between the hub body and the freewheel body. Thus, the protruding portion with the engaging pieces can be rotated around the shaft simultaneously, and an upper end of each of the engaging pieces, which is borne by the elastic piece to stick out from the engaging slot, has a row of engaging teeth. The engaging teeth are configured to engage with the driving teeth on the driving ring, so that the driving ring and the ratchet unit can be rotated simultaneously. Furthermore, an angle of applying force between the engaging piece and the driving ring is between 100 and 110 degrees. Moreover, the total number of the engaging teeth on the engaging pieces is between 20 and 32 teeth while each of the engaging pieces has 4-8 engaging teeth, and an angle between two adjacent engaging teeth is between 55 and 60 degrees.

Comparing with conventional bicycle hub apparatus, the present invention is advantageous because: (i) since the separated distances between two adjacent driving teeth is smaller, the driving ring comprises more driving teeth, and the number thereof is up to 155 teeth. Also, the engaging pieces of the ratchet unit and the driving ring respectively have smaller engaging teeth and driving teeth, and the sizes thereof are corresponding to each other. Thus, the bicycle hub apparatus in the present invention improves the efficiency of engaging process between the engaging teeth and the driving teeth, and further lowers the possibility of missing step and the risk of use; and (ii) an engaging angle between driving teeth and the engaging teeth is less than 70 degrees, so that the present invention can efficiently reduce the frictional resistance and the energy consumption during the engaging process. Moreover, combining with the design mentioned in (i), the bicycle hub apparatus in the present invention can further reduce abrasions occurred between the driving teeth and the engaging teeth, thus improving the life time and practicality of the bicycle hub apparatus.

DETAILED DESCRIPTION OF THE INVENTION

Figure 1:
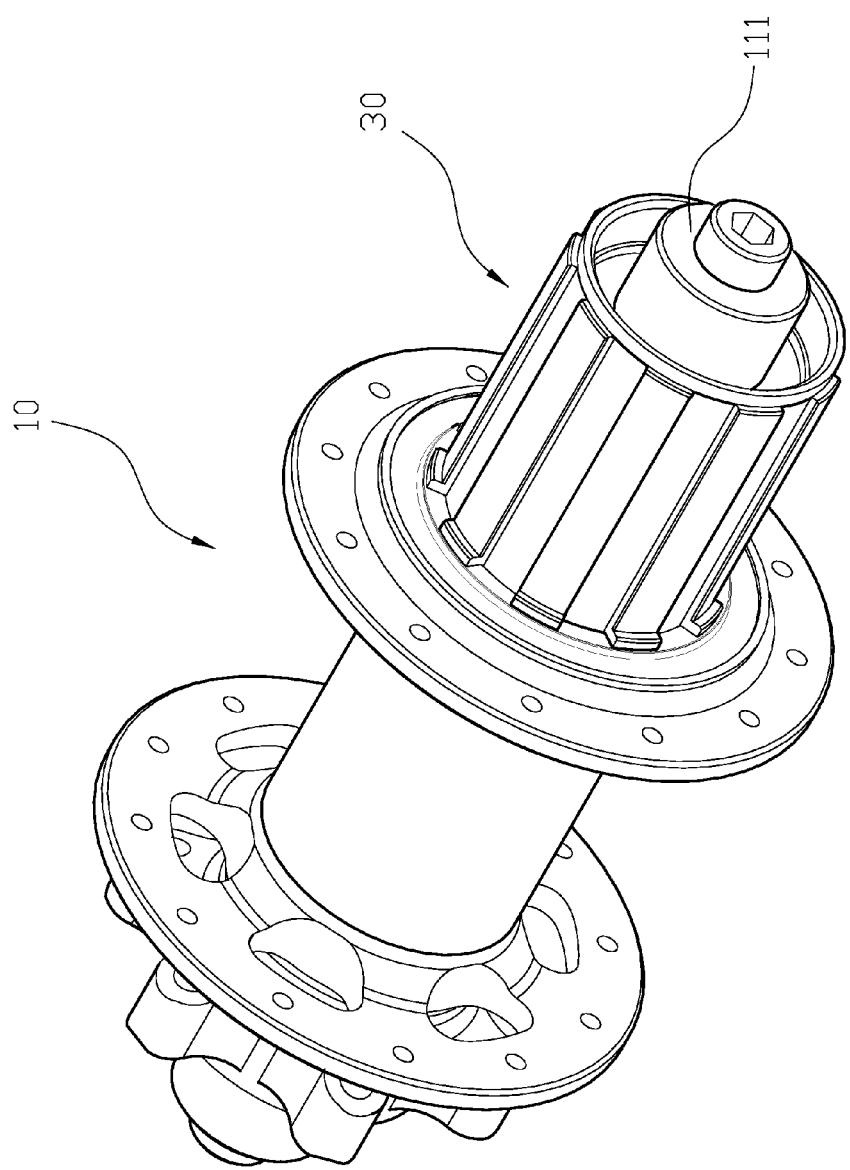
FIG. 1 is a three-dimensional view of a bicycle hub apparatus in the present invention.
Figure 2:
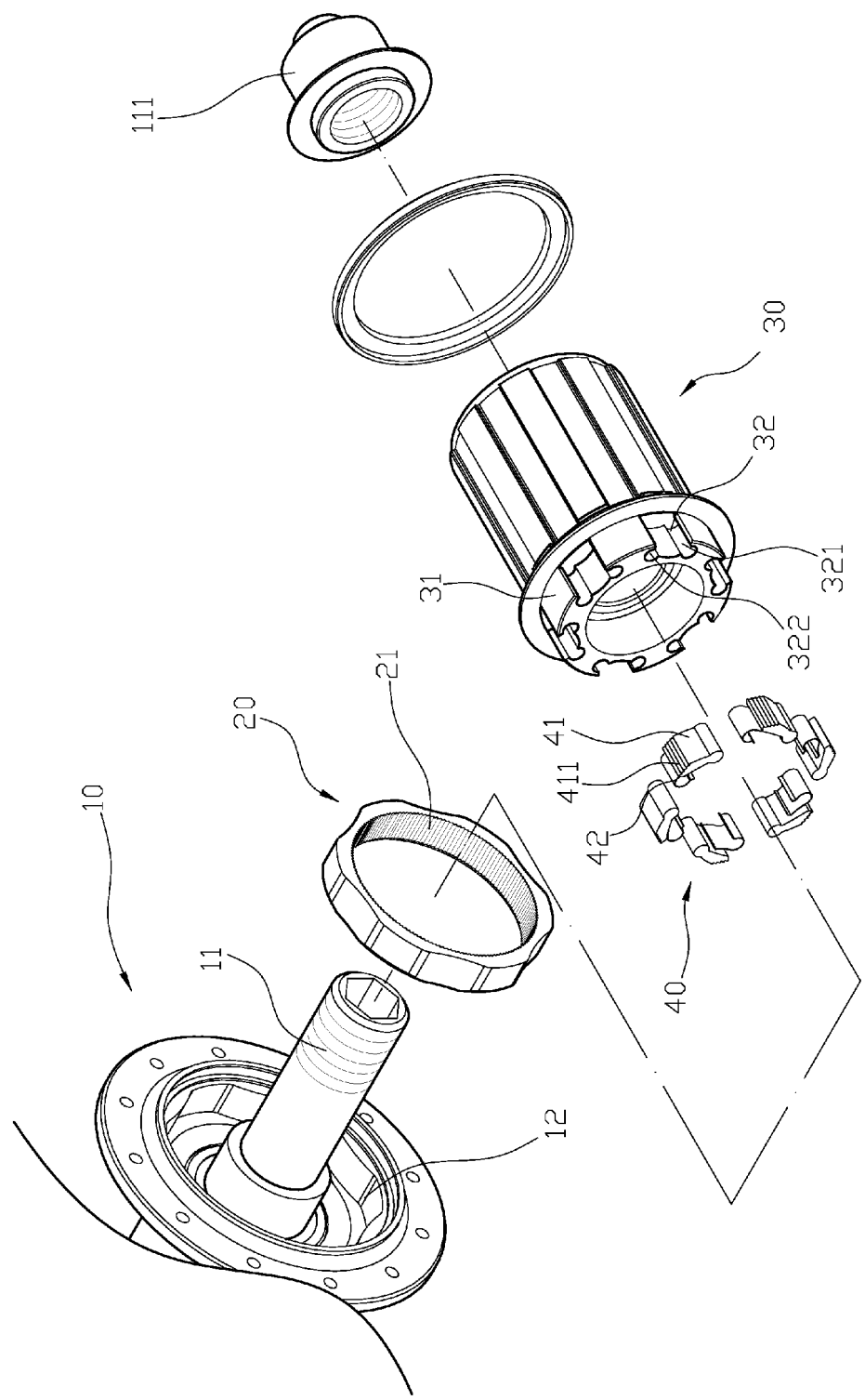
FIG. 2 is an exploded view of the bicycle hub apparatus in the present invention.
Figure 3:
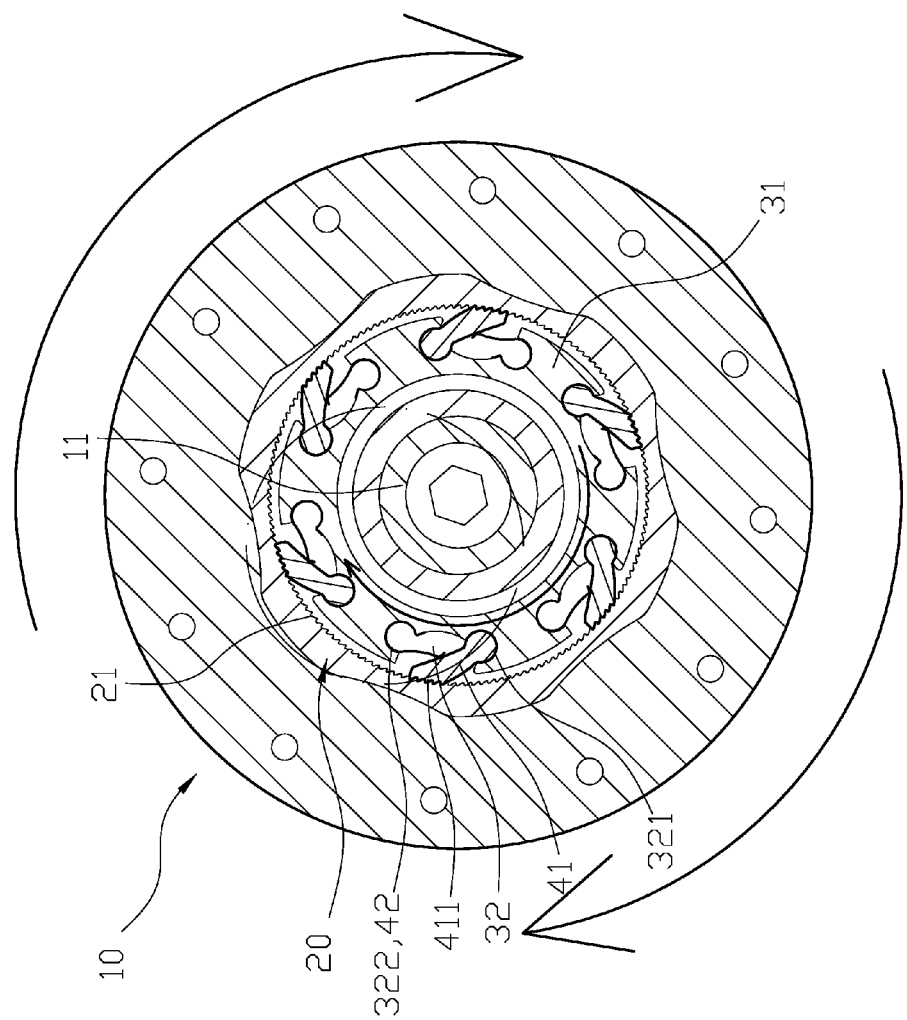
FIG. 3 is a sectional assembly view of the bicycle hub apparatus in the present invention when a bicyclist pedaling in a forward direction.
Figure 4:
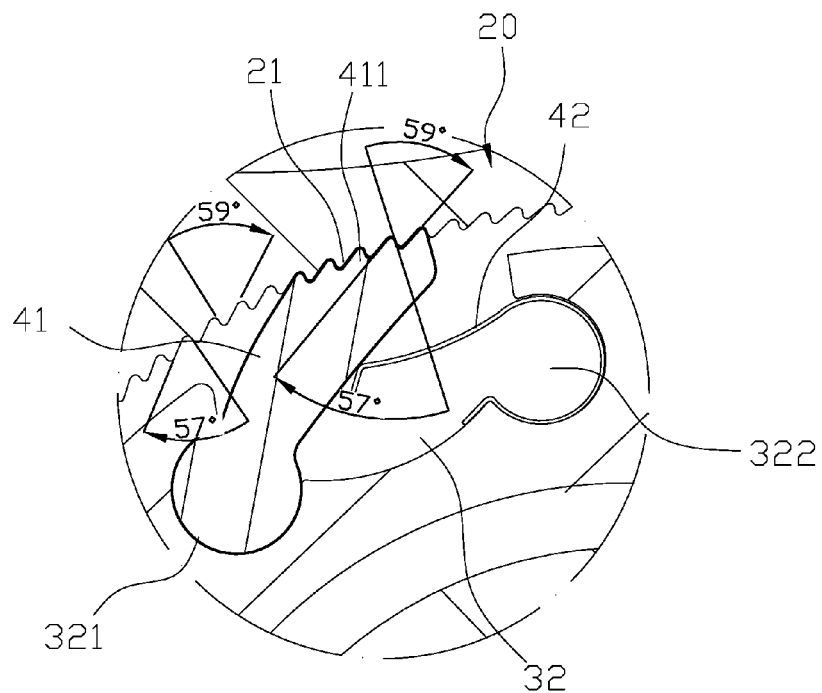
FIG. 4 is a partial enlarged schematic view of the bicycle hub apparatus in the present invention when engaging teeth on an engaging piece are engaged with driving teeth on the driving ring.
Figure 5:
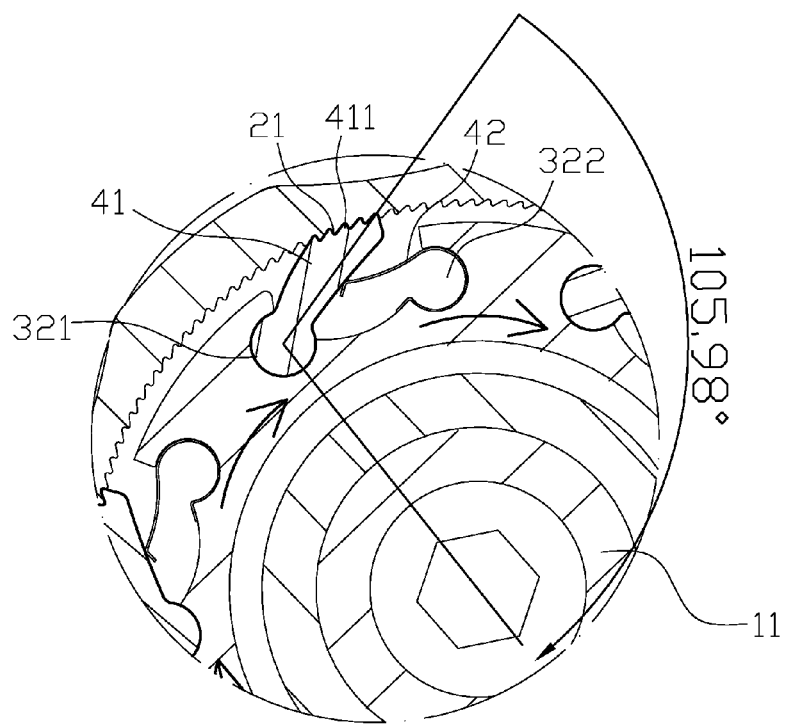
FIG. 5 is a schematic view of the bicycle hub apparatus in present invention when a force drives the engaging pieces and the driving ring to rotate simultaneously.
Figure 6:
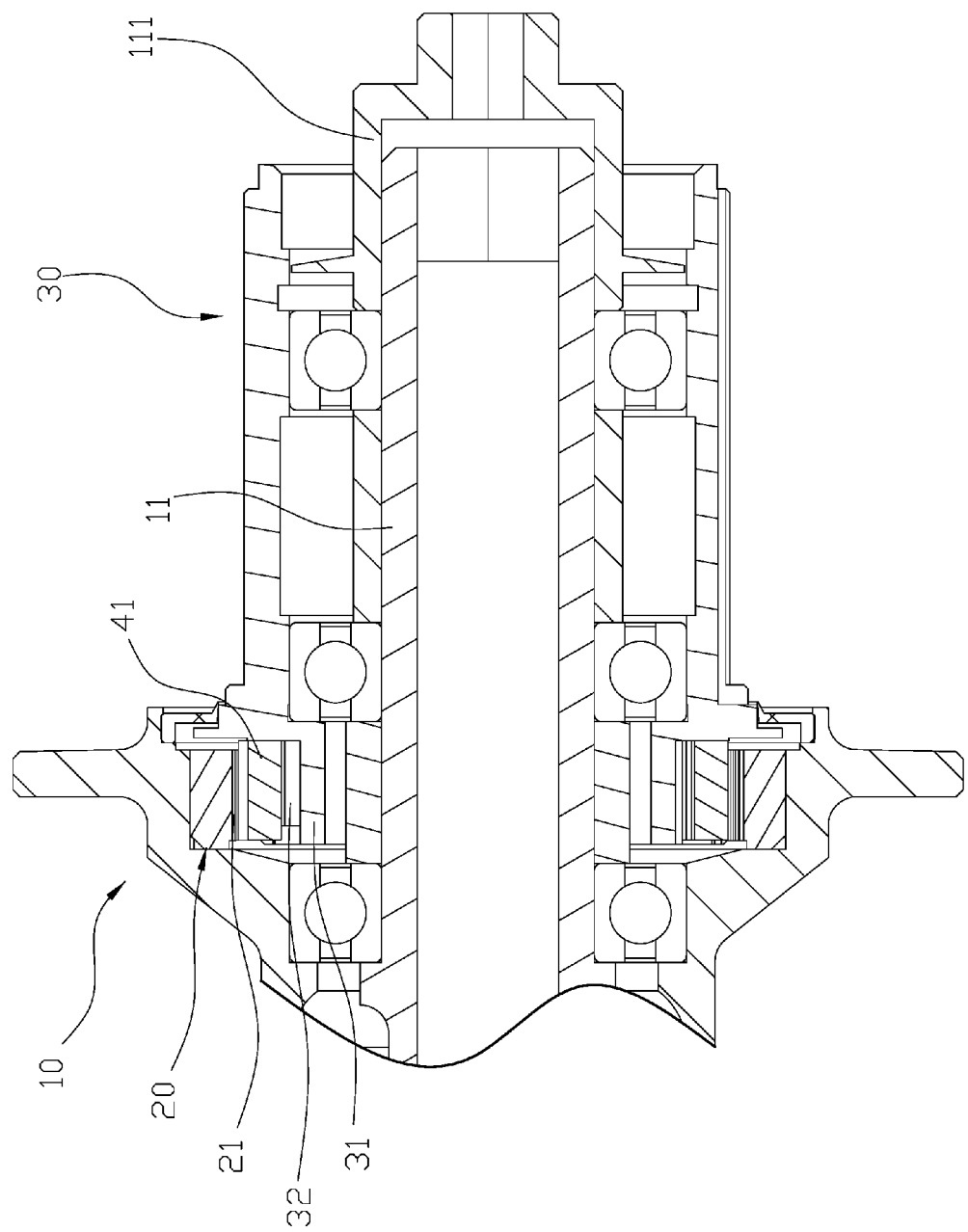
FIG. 6 is a sectional assembly view of another embodiment of the bicycle hub apparatus in the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 5, the present invention provides a bicycle hub apparatus, which comprises a hub body (10), a driving ring (20), a freewheel body (30), and a ratchet unit (40). The hub body (10) is rotatably mounted on a shaft (11), and a connecting space (12) formed at a first end of the hub body (10) is configured to engage with the driving ring (20). The driving ring (20) has an inner periphery and an outer periphery, and a plurality of driving teeth (21) are sequentially formed around the inner periphery of the driving ring (20). The number of the driving teeth (21) can be between 145 and 155 teeth, and an optimized amount of the driving teeth is 150 teeth. Also, an angle of a peak of each of the driving teeth (21) can be between 57 and 62 degrees, and an optimized angle thereof is 59 degrees. Moreover, an angle between two adjacent driving teeth (21) can be between 55 and 60 degrees. The freewheel body (30) is mounted on the first end of the hub body (10), and a first end of the freewheel body (30) facing to the hub body (10) comprises a protruding portion (31). An outer periphery of the protruding portion (31) has at least two engaging slots (32) to respectively engage with two engaging pieces (41) of the ratchet unit (40), and the protruding portion (31) at most can have six engaging slots (32) to respectively engage with six engaging pieces (41) of the ratchet unit (40). Moreover, each of the engaging slots (32) has a first groove portion (321) and a second groove portion (322), and the number of the engaging pieces (41) of the ratchet unit (40) is the same as the engaging slots (32) of the freewheel body (30). Each of the engaging pieces (41) comprises an elastic piece (42) which is configured to engage with the engaging slot (32), so that the engaging pieces (41) can be secured between the hub body (10) and the freewheel body (30). Thus, the protruding portion (31) with the engaging pieces (41) can be rotated around the shaft (11) simultaneously, and an upper end of each of the engaging pieces (41), which is borne by the elastic piece (42) to stick out from the engaging slot (32), has a row of engaging teeth (411). The engaging teeth (411) are configured to engage with the driving teeth (21) on the driving ring (20), so that the driving ring (20) and the ratchet unit (40) can be rotated simultaneously. Furthermore, an angle of applying force between the engaging piece (41) and the driving ring (20) is between 100 and 110 degrees, and an optimized angle thereof is 105 degrees. Moreover, the total number of the engaging teeth (411) on the engaging pieces is between 20 and 32 teeth while each of the engaging pieces (41) has 4-8 engaging teeth (411). In one embodiment, the ratchet unit (40) comprises six engaging pieces (41), and each of the engaging pieces (41) has five engaging teeth (411). Thus, the total number of the engaging teeth (411) is 30 teeth. Also, an angle between two adjacent engaging teeth (411) is between 55 and 60 degrees, and an optimized angle thereof is 57 degrees. Furthermore, an angle of a peak of each of the engaging teeth (411) is between 57 and 62 degrees.

Structurally, referring to FIGS. 1, 2, 3, and 6, the hub body (10) is connected to the driving ring (20) through the connecting space (12), and the engaging pieces (41) are respectively engaging with the engaging slots (32) on the protruding portion (31) of the freewheel body (30). Also, the first groove portions (321) and the second groove portions (322) are respectively engaged with the engaging pieces (41) and the elastic pieces (42), so that each of the engaging pieces (41) which is borne by the elastic piece (42) can take the first groove portion (321) as a center to rotate and stick out from the engaging slot (32). Then, the freewheel body (30) with the engaging pieces (41) is connected to the first end of the hub body (10) through the driving ring (20). Furthermore, the engaging teeth (411) are respectively engaged with the driving teeth (21) of the driving ring (20), and the ratchet unit (40) is secured between the freewheel body (30) and the hub body (10). Moreover, after the freewheel body (30) is engaged with the hub body (10), a shaft seal (111) is screwed on an outer end of the shaft (11) which is a far end from the hub body (10) to limit positions of the freewheel body (30) and other components on the shaft (11). As a result, through the ratchet unit (40), the freewheel body (30) and the hub body (10) can be engaged to rotate simultaneously or be disengaged to rotate individually.

Figure 8:
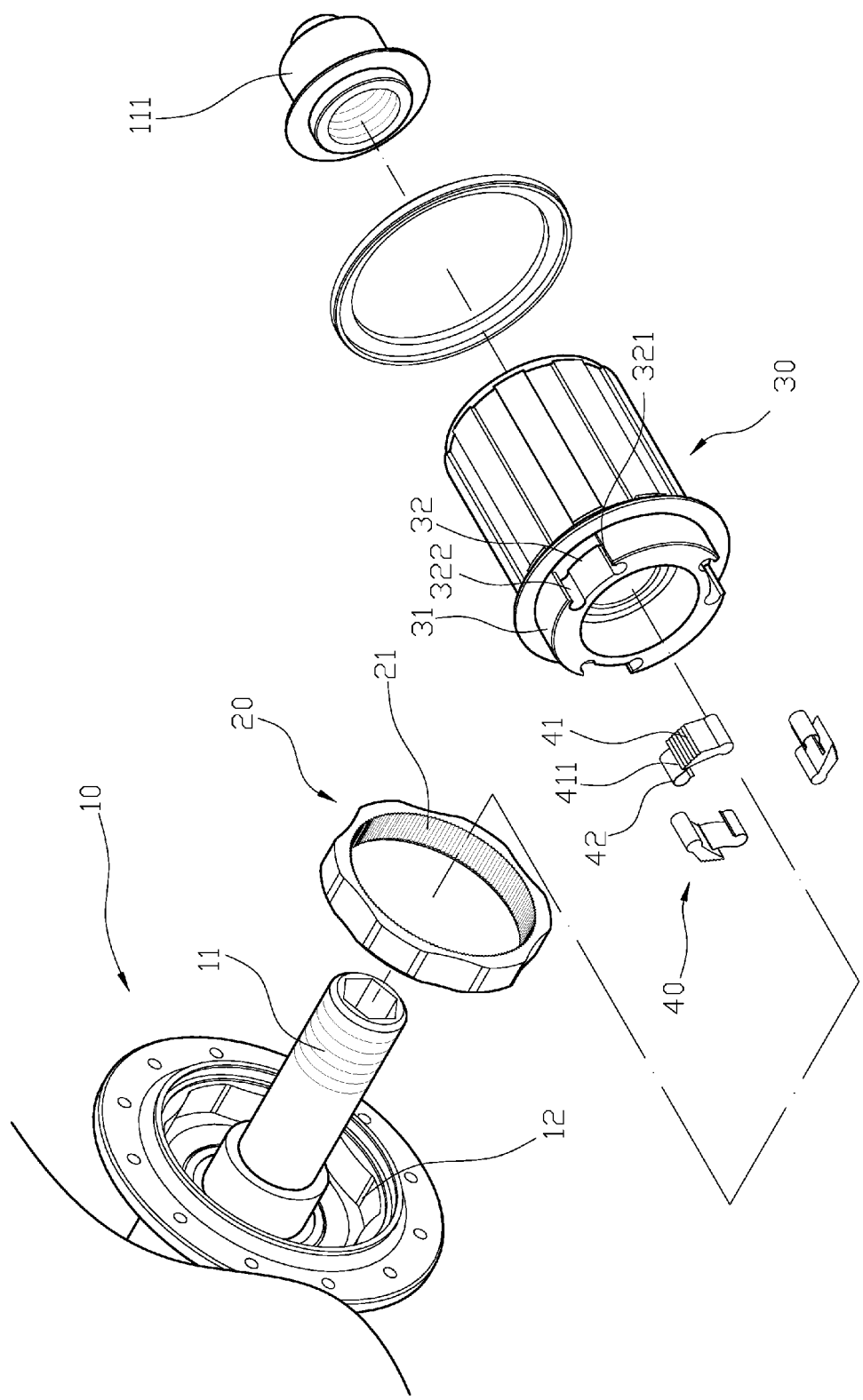
FIG. 8 is an exploded view of another embodiment of the bicycle hub apparatus in the present invention.
Figure 9:
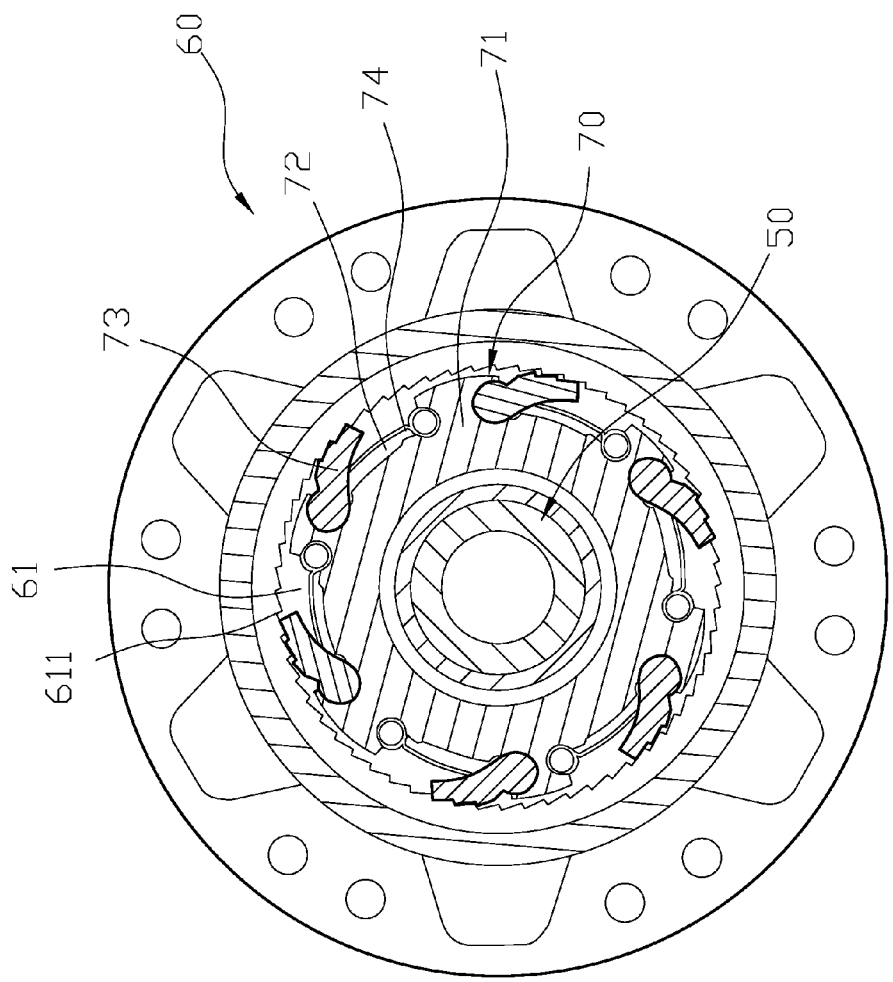
FIG. 9 is a prior art.

In another embodiment, referring to FIG. 8, the protruding portion (31) of the freewheel body (30) comprises three engaging slots (32) which are respectively engaged with three engaging pieces (41), and each of engaging pieces (41) has seven engaging teeth (411). Thus, the total number of the engaging teeth (411) is 21 teeth.

In actual application, referring to FIGS. 3 to 6, the hub body (10) can connect to the wheel through the freewheel body (30) (not shown). When a bicyclist starts pedaling, a force transmitted through crankarms drives the freewheel to rotate the freewheel body (30). When the bicyclist pedaling forward, the freewheel body (30) through the ratchet unit (40) is engaged with the driving teeth (21) of the driving ring (20). Therefore, the driving ring (20) can drive the hub body (10) to rotate in a forward direction, and thus the bicycle is moved forward. Since the number of the driving teeth (21) on the driving ring (20) is up to 150 teeth, the separated distances between each two adjacent driving tooth (21) is smaller, resulting in each of the driving teeth (21) formed in a serrated shape. Also, each of the engaging teeth (411) on the engaging pieces (41) corresponding to the driving tooth (21) is formed in a serrated shape. As a result, the above structure can enhance the speed of engaging process between the engaging teeth (411) and the driving teeth (21), and further lower the possibility of missing step and the risk of use.

Figure 7:
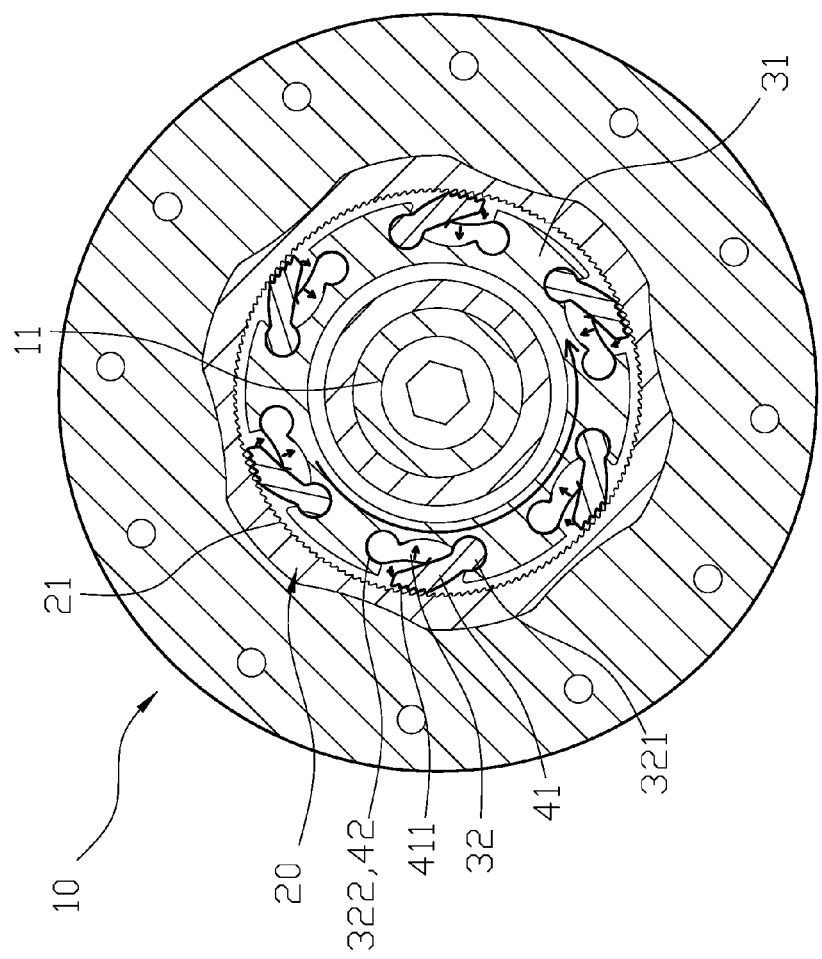
FIG. 7 is a schematic view of the bicycle hub apparatus in the present invention, when a bicyclist pedaling in a reverse direction.

On the other hand, when the bicyclist pedaling in a reverse direction, referring to FIG. 7, a rotation direction of the engaging teeth (411) on the engaging pieces (41) is opposite to a direction to engage with the driving teeth (21), and thus the engaging pieces (41) disengaged with the driving teeth (21) are respectively moved inwardly into the engaging slots (32). Since the freewheel body (30) with the ratchet unit (40) has no contact with the driving ring (20), the hub body (10) is not driven by the freewheel body (30) when pedaling in reverse. Moreover, when the bicyclist stops pedaling during the bicycle moving forward, the engaging pieces (41), likewise, are disengaged with the driving teeth (21) on the driving ring (20). Thus, the hub body (10) rotates individually, and the bicycle keeps coasting.

Comparing with conventional bicycle hub apparatus, the present invention is advantageous because: (i) since the separated distances between two adjacent driving teeth (21) is smaller, the driving ring (20) comprises more driving teeth (21), and the number thereof is up to 155 teeth. Also, the engaging pieces (41) of the ratchet unit (40) and the driving ring (21) respectively have smaller engaging teeth (411) and driving teeth (21), and the sizes thereof are corresponding to each other. Thus, the bicycle hub apparatus in the present invention improves the efficiency of engaging process between the engaging teeth (411) and the driving teeth (21), and further lowers the possibility of missing step and the risk of use; and (ii) an engaging angle between driving teeth (21) and the engaging teeth (411) is less than 70 degrees, so that the present invention can efficiently reduce the frictional resistance and the energy consumption during the engaging process. Moreover, combining with the design mentioned in (i), the bicycle hub apparatus in the present invention can further reduce abrasions occurred between the driving teeth (21) and the engaging teeth (41), thus improving the life time and practicality of the bicycle hub apparatus.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A bicycle hub apparatus comprising,
a hub body rotatably mounted on a shaft, and a connecting space, which is formed at a first end of the hub body and configured to engage with a driving ring;
the driving ring having a plurality of driving teeth sequentially formed around an inner periphery of the driving ring, the driving teeth having between 145 and 155 teeth, and an angle of a peak of each of the driving teeth being between 57 and 62 degrees, and an angle between two adjacent driving teeth being between 55 and 60 degrees;
a freewheel body mounted on the first end of the hub body, and a first end of the freewheel body, which faces to the hub body, comprising a protruding portion, and an outer periphery of the protruding portion having at least two engaging slots; and
a ratchet unit having a plurality of engaging pieces, and a number of the engaging pieces corresponding to a number of the engaging slots on the protruding portion, each of the engaging pieces comprising an elastic piece which is configured to engage with the engaging slot, so that the engaging pieces being able to be secured between the hub body and the freewheel body, thus, the protruding portion with the engaging pieces being able to be rotated around the shaft simultaneously, and an upper end of each of the engaging pieces, which is borne by the elastic piece to stick out from the engaging slot, having a row of engaging teeth, and the engaging teeth configured to engage with the driving teeth on the driving ring, so that the driving ring and the ratchet unit being able to be rotated simultaneously, wherein an angle of applying force between the engaging piece and the driving ring is between 100 and 110 degrees, and total number of the engaging teeth on the engaging pieces is between 20 and 32 teeth while each of the engaging pieces has 4-8 engaging teeth, and an angle between two adjacent engaging teeth is between 55 and 60 degrees, and an angle of a peak of each of the engaging teeth is between 57 and 62 degrees.

2. The bicycle hub apparatus of claim 1, wherein the protruding portion has six engaging slots at most to respectively engage with six engaging pieces of the ratchet unit.

3. The bicycle hub apparatus of claim 1, wherein each of the engaging slots has a first groove portion and a second groove portion, which are respectively engaged with the engaging pieces and the elastic pieces, so that each of the engaging pieces, which is borne by the elastic piece, is able to take the first groove portion as a center to rotate and stick out from the engaging slot.

4. The bicycle hub apparatus of claim 1, wherein an optimized amount of the driving teeth on the driving ring is 150 teeth.

5. The bicycle hub apparatus of claim 1, wherein an optimized angle of a peak of each of the driving teeth is 59 degrees.

6. The bicycle hub apparatus of claim 1, wherein an optimized angle of applying force between the engaging piece and the driving ring is 105 degrees.

7. The bicycle hub apparatus of claim 1, wherein an optimized angle of a peak of each of the engaging teeth is 57 degrees.

* * * * *